(12) United States Patent
Okuwaki et al.

(10) Patent No.: US 7,011,442 B2
(45) Date of Patent: Mar. 14, 2006

(54) PLANAR LIGHT SOURCE

(75) Inventors: Daisaku Okuwaki, Yamanashi (JP); Junji Miyashita, Yamanashi (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 169 days.

(21) Appl. No.: 10/689,733

(22) Filed: Oct. 22, 2003

(65) Prior Publication Data

US 2004/0085750 A1    May 6, 2004

(30) Foreign Application Priority Data

Oct. 22, 2002    (JP)    ............................ P2002-307698

(51) Int. Cl.
*F21V 7/04*    (2006.01)

(52) U.S. Cl. ........................ 362/626; 362/623; 362/621

(58) Field of Classification Search ................. 362/31, 362/26, 558, 559, 246, 330, 800, 607, 608, 362/609, 612, 613, 615, 616, 620, 623, 625, 362/626; 349/65, 67
See application file for complete search history.

(56) References Cited

U.S. PATENT DOCUMENTS

| | | | | |
|---|---|---|---|---|
| 5,359,691 A | * | 10/1994 | Tai et al. | ..................... 385/146 |
| 5,659,410 A | * | 8/1997 | Koike et al. | ................... 349/62 |
| 5,712,694 A | * | 1/1998 | Taira et al. | ..................... 349/9 |
| 6,443,583 B1 | * | 9/2002 | Ha | .............................. 362/608 |
| 6,572,236 B1 | * | 6/2003 | Suzuki et al. | ............... 362/600 |
| 2001/0036068 A1 | * | 11/2001 | Suzuki et al. | .................. 362/31 |

FOREIGN PATENT DOCUMENTS

JP    2003-294954 A    10/2003

* cited by examiner

*Primary Examiner*—Sandra O'Shea
*Assistant Examiner*—Gunyoung T. Lee
(74) *Attorney, Agent, or Firm*—Browdy and Neimark, PLLC

(57) ABSTRACT

A planar light source of this invention is formed with chamfered portions at an upper end of the light receiving side surface where the light receiving side surface and the light emitting surface of the light guide plate intersect and at a lower end of the light receiving side surface where the light receiving side surface and the reflection surface of the light guide plate intersect. The chamfered portions can make indistinguishable the bright lines, that may be produced during illumination, to prevent a dark-bright fringe pattern from showing up, thereby preventing a possible degradation of liquid crystal display quality.

6 Claims, 11 Drawing Sheets

(a)

(b)

Directivity characteristic of light source

PLANAR LIGHT SOURCE

BACKGROUND OF THE INVENTION

1. Field of the Invention

The present invention relates to a planar light source for illuminating a liquid crystal panel and the like from their back.

2. Description of the Prior Art

Small liquid crystal displays have been used in recent years in cellular phones and other portable information terminals and, as a means for illuminating such liquid crystal displays, a planar light source is used. The planar light source is constructed of a plate-like light guide plate and light emitting diodes (LEDs) arranged to face a side surface of the light guide plate. Thanks to its ability to be reduced easily in size and thickness, the planar light source has found wide uses.

In the planar light source, light emitted from the LEDs enters into the light guide plate and propagates as it is repetitively reflected within the light guide plate. The light is reflected or refracted by grooves or a textured pattern formed in an underside of the light guide plate until it goes out of the plate. The light emitted from the top surface of the light guide plate travels toward and illuminates the liquid crystal display.

An example of such a conventional planar light source is shown in FIG. 6 (e.g., Japanese Patent Application No. 2002-093383, FIG. 7). FIG. 6 illustrates a construction of a planar light source 110 which has LEDs 101 as a light source, a light guide plate 102, a prism sheet 103, a reflector plate 106 and a liquid crystal panel 107. The light guide plate 102 is rectangular and made of a light-transmitting glass or resin. Denoted 102a is a top surface of the light guide plate 102. Designated 102c is a light receiving side surface facing the LEDs 101. Designated 102b is a bottom surface of the light guide plate 102. The bottom surface 102b is formed with a plurality of asymmetric prisms 102b1 facing the top surface 102a. The asymmetric prisms 102b1 each comprise a down slope 102b11 whose distance to the top surface 102a sharply increases as it moves away from the light receiving side surface 102c and an up slope 102b12 whose distance to the top surface 102a moderately decreases. Arranged opposite the light receiving side surface 102c are three LEDs 101 supported on a retainer member 101b.

When a predetermined amount of electricity is supplied from a power supply not shown to the LEDs 101, the LEDs 101 illuminate in white or a predetermined color. The light emitted from the LEDs 101 is refracted by the light receiving side surface 102c as it enters the light guide plate 102. The light that has entered the light guide plate 102 is repetitively reflected between the top surface 102a and the bottom surface 102b of the light guide plate 102 before it is refracted by the top surface 102a and leaves the light guide plate 102. The light then enters the prism sheet 103, in which it is specular-reflected until its propagation direction is changed to a Z direction. The light traveling in the Z direction is now incident on the liquid crystal panel 107. Therefore, the light passes through the liquid crystal in an ideal direction, making a clear and vivid image display possible.

FIG. 7 is a side view showing a path of light emitted from the LEDs 101 that has entered the light guide plate 102. In the figure, a light ray emitted from the LEDs 101 at an output or emittance angle of θi enters the light receiving side surface 102c of the light guide plate 102 at an incidence angle of θi. At this time, the ray is refracted on this plane and a relationship between the incidence angle θi and a refracted angle θ is, according to Snell's law, n·sin θ=sin θi assuming that a refractive index of air is 1 and a refractive index of the light guide plate 102 (made of polycarbonate and the like) is n. From this we obtain $$\theta = \sin^{-1}((1/n)\sin \theta i) \quad (1)$$

If, for example, the light guide plate 102 has a refractive index of n=1.58 and θi=90°, calculating the equation (1) results in $\theta = \sin^{-1}(1/1.58) = 39.3°$ and thus the critical angle θc is θc=39.3°.

It should be noted, however, that since the incidence angle in reality is less than 90° at maximum, the refracted angle θ even at its maximum is less than the critical angle θc. The critical angle θc of the light guide plate 102 is generally around 40°, so the refracted angle θ even at its maximum does not exceed 40°. The light ray that has passed through the light receiving side surface 102c at the refracted angle θ is incident on the top surface 102a of the light guide plate 102 at an incidence angle $\theta_1$. At this time, as can be seen from FIG. 7, since a relation of (θ+$\theta_1$=90°) holds and the refracted angle θ is equal to or less than 40°, as described above, the incidence angle $\theta_1$ is equal to or more than 50°, which is larger than the critical angle θc of around 40°. Thus, the ray incident on the top surface 102a is totally reflected at a reflection angle $\theta_1$.

The reflected light then strikes, at an incidence angle of $\theta_2 = \theta_1 - \alpha$, the up slope 102b12 of the bottom surface which has an inclination angle of α. Here the inclination angle α is about 1° to several degrees.

The ray that has struck the up slope 102b12 at an incidence angle $\theta_2$ is reflected by this surface at a reflection angle $\theta_2$ and then strikes the top surface 102a at an incidence angle of $\theta_3 = \theta_2 - \alpha = \theta_1 - 2\alpha$. The ray is then reflected by the top surface 102a at a reflection angle θ3 to hit the up slope 102b12 at an incidence angle of $\theta_4 = \theta_3 - \alpha = \theta_1 - 3\alpha$. Each time the light ray, that was first reflected by the top surface 102a at a reflection angle $\theta_1$, strikes the up slope 102b12 or the top surface 102a, its incidence angle decreases by an amount equal to the inclination angle α. That is, when the ray, that was first reflected at a reflection angle of $\theta_1$, strikes the up slope 102b12 or top surface 102a for an Nth time after repetitive reflections, its incidence angle $\theta_N$ is given by $$\theta_N = \theta_1 - (N-1)\alpha \quad (2)$$

In this light guide plate, the light incidence or reflection on its boundary surface, shown at $\theta_1$, is counted as the first incidence/reflection (i.e., N=1).

When the decreasing incidence angle $\theta_N$ has the following relation with the critical angle θc:

$$\theta_N = \theta_1 - (N-1)\alpha < \theta c \quad (3)$$

then, the ray passes through the top surface 102a or the up slope 102b12 of the bottom surface 102b and gets out of the light guide plate 102. For example, if $\theta_1$=52°, α=1° and θc=40°, the condition of equation (3) is met when N is more than 13. This means that the light ray must strike the top or bottom surface of the light guide plate 102 fourteen times or more. Therefore, near the light receiving side surface 102c the ray does not escape to the outside. For example, if the light guide plate 102 has a thickness of 1 mm, the ray does not exit the light guide plate 102 from within about 3 mm of the light receiving side surface 102c but normally exits from a region more than 3 mm away from the light receiving side surface 102c. In the region from which the light ray exits normally, there are no light intensity variations.

However, conventional backlight units using such a light guide plate 102 often have the following problems. As shown in a plan view of FIG. 8, in an area S1 within 3–4 mm of the light receiving side surface 102c of the light guide plate 102 several bright lines show up (in FIG. 8 the bright lines are shown hatched with thick lines). S2 represents an area where bright lines do not show. The conspicuous bright lines 14 are considered to be caused as follows. As shown in FIG. 10, rays of light emitted from the LEDs 101 enter the light guide plate 102 from an edge portion 102d where the light receiving side surface 102c and the top surface 102a of the light guide plate 102 cross each other.

In FIG. 11 representing a "light source directivity of LED," those of the rays emitted from LEDs 101 which reach the edge portion 102d are light traveling in a direction that corresponds to a region SL shown hatched.

If the edge portion 102d has a rough surface, rather than a mirror surface, the light rays from the LEDs 101 enter the edge portion 102d not through normal refraction but through scattering. That is, from the edge portion 102d a plurality of rays travel through the light guide plate 102 in different directions, making the edge portion 102d look as if it were illuminating. Thus, the edge portion 102d can be regarded as a secondary light source. A similar secondary light source also occurs at a lower edge portion 102e of the light guide plate 102 where the light receiving side surface 102c and the bottom surface 102b intersect. In the conventional light guide plate 102 the edge portions 102d, 102e are formed almost at right angles, so their transferability in a molding process is bad, making their surface rough, which in turn results in secondary light sources being easily formed.

As to the secondary light source illuminating at the edge portion 102d, an incidence angle θb that the light from the secondary light source has with respect to the up slope 102b12 of the bottom surface 102b can be smaller than the critical angle θc, as shown in FIG. 9. In that case, as illustrated by a ray s21, the light ray passes through the up slope 102b12 and is then reflected by the reflector plate 106 under the slope to reenter the light guide plate 102 and pass through the top surface 102a, illuminating the light guide plate 102 upward. Because the range of this light emission is wide, no bright lines are produced.

In a case where the incidence angle θb is larger than the critical angle θc, the ray is reflected by the up slope 102b12 and exits through the top surface 102a, as indicated by a ray s22. The number of times that the ray strikes, as by reflection, the top or bottom surface before it exits, the light guide plate 102 varies depending on a difference between the incidence angle θb and the critical angle θc, as explained above. As the difference increases, so does the number of times the ray needs to strike the top or bottom surface. This is described in more detail by referring to FIG. 10. In FIG. 10, $\phi_1$, $\phi_2$, $\phi_3$ and $\phi_4$ represent light fluxes emanating from the edge portion 102d and an angular range of each flux is assumed to be smaller than the inclination angle α of the up slope 102b12. Concerning refracted angles of these light fluxes on the top surface 102a as they exit the light guide plate 102, it is assumed that the refracted angle of the light flux $\phi_1$ is the smallest, with those of $\phi_2$, $\phi_3$ and $\phi_4$ progressively increasing in that order in steps of the inclination angle α.

Let the refracted angles of the light fluxes $\phi_1$, $\phi_2$, $\phi_3$ and $\phi_4$ be $\theta_{d1}$, $\theta_{d2}$, $\theta_{d3}$ and $\theta_{d4}$ respectively. These refracted angles are assumed to have the following relations with the critical angle θc:

$\theta_{d1} = 1.5\alpha + \theta c$ $\theta_{d2} = 2.5\alpha + \theta c$ $\theta_{d3} = 3.5\alpha + \theta c$ $\theta_{d4} = 4.5\alpha + \theta c$ (4)

As shown in FIG. 10, all of the light fluxes $\phi_1$, $\phi_2$, $\phi_3$, $\phi_4$ strike for a first time the boundary surface, or the up slope 102b12, and their incidence angles at this time are $\theta_{d1} - \alpha$, $\theta_{d2} - \alpha$, $\theta_{d3} - \alpha$ and $\theta_{d4} - \alpha$ respectively. From equation (4), all these incidence angles are larger than the critical angle θc and therefore reflected by the up slope 102b12. The reflected light fluxes strike for a second time the boundary surface, or the top surface 102a, and their incidence angles at this time are:

$\theta_{d1} - 2\alpha < \theta c$, $\theta_{d2} - 2\alpha > \theta c$, $\theta_{d3} - 2\alpha > \theta c$ and $\theta_{d4} - \alpha > \theta c$.

Only the incidence angle of the light flux $\phi_1$, $\theta_{d1} - 2\alpha$, is less than the critical angle θc and this flux $\phi_1$ with a width $b_1$ exits from the top surface 102a.

The remaining fluxes $\phi_2$, $\phi_3$, $\phi_4$ are reflected by the top surface 102a and are incident for a third time on the boundary surface, this time the up slope 102b12, and from equation (4) their incidence angles are:

$\theta_{d2} - 3\alpha < \theta c$, $\theta_{d3} - 3\alpha > \theta c$ and $\theta_{d4} - 3\alpha > \theta c$.

Only the incidence angle of the light flux $\phi_2$, $\theta_{d1} - 3\alpha$, is less than the critical angle θc and the flux $\phi_2$ with a width $b_2$ exits from the up slope 102b12. Similarly, a fourth striking on the boundary surface results in the light flux $\phi_3$ with a width $b_3$ exiting from the top surface 102a. On a fifth striking, the flux $\phi_4$ exits from the up slope 102b12 in a width $b_4$.

As described above, these fluxes successively escape outside according to the number of times the light has struck the boundary surfaces. The width of the light flux as it leaves the light guide plate 102 progressively increases according to the number of boundary surface striking times. The light flux widths has the following relation:

$b_1 < b_2 < b_3 < b_4$.

This may be explained as follows. Although the fluxes $\phi_1$, $\phi_2$, $\phi_3$, $\phi_4$ have the same angular range, the actual width of each flux increases in proportion to the length of flux path. The larger the number of times the flux strikes the boundary surfaces, the longer the flux path and the larger the actual width of the flux. In FIG. 10, the flux that has escaped from the up slope 102b12 of the bottom surface is reflected by the reflector plate 106 as shown in FIG. 9 and reenters the light guide plate 102 before exiting the top surface 102a. It is thus considered possible to deal with this light flux in the same way as if it first exited from the top surface 102a.

In the following discussion, the outgoing light rays of the fluxes $\phi_1$, $\phi_2$, $\phi_3$, $\phi_4$ of FIG. 10 are considered in relation to the bright lines 14①, 14②, 14③, 14④ shown in FIG. 8. An exit light of the flux $\phi_1$ with the width b1 shown in FIG. 10 is situated closest to the light receiving side surface 102c and its width is narrowest, so that it is considered to correspond to the bright line 14① of FIG. 8. An exit light of the flux $\phi_2$ with the width b2 shown in FIG. 10 is situated second closest to the light receiving side surface 102c and its width is slightly wider than $b_1$. So, this flux is considered to match the bright line 14② of FIG. 8. Similarly, exit light of the fluxes $\phi_3$, $\phi_4$ shown in FIG. 10 is considered to correspond to the bright lines 14③, 14④, respectively.

If the refracted angle of the flux $\phi_4$ on the top surface 102*a* shown in FIG. 10 increases, the number of times that the flux strikes the boundary surface before it exits the light guide plate 102 also increases and the position at which it leaves the light guide plate 102 is further away from the light receiving side surface 102*c*, increasing the width of the outgoing flux, which in turn is considered to reduce a light quantity per unit area or brightness. This agrees with the fact that, as the bright lines shown hatched with thick lines in the FIG. 8 plan view of the light guide plate 102 move away from the light receiving side surface 102*c*, the width of the bright lines increases, making them less conspicuous. Therefore, the marked bright lines such as shown in FIG. 8 are considered to be caused by the presence of those light rays emitted from the edge portion 102*d* which go out of the light guide plate 102 with a relatively small number of boundary surface striking times (1–4 times).

In the above description the edge portion 102*d* of FIG. 9 has been described to be a secondary light source. In a case where the lower edge portion 102*e* functions as a secondary light source, too, light rays with their incidence angles on the top surface 102*a* greater than the critical angle produce bright lines according to the same principle described above. These bright lines tend to become more conspicuous when a member for restricting a direction of light, such as the prism sheet 103 of FIG. 6 or diffusion sheet (not shown), is installed above the light guide plate 102. Although the above description has taken up, as an example case of bright lines, a construction in which a reflection surface of the bottom surface 102*b* of the light guide plate 102 is formed of asymmetric prisms 102*b*1, the principle of bright line generation also applies to other constructions in which the reflection surface on the bottom surface 102*b* of the light guide plate 102 is formed of symmetric prisms or formed with a regular or irregular pattern of recessed and raised portions formed by printing, surface texturing or dot formation. That is, even in these cases, as long as a secondary light source is produced at the edge portions 102*d*, 102*e* of the light guide plate 102, there is a problem that bright lines show up when the light guide plate 102 is illuminated. When these bright lines are produced, bright and dark fringes show up, marring the appearance of the planar light source.

SUMMARY OF THE INVENTION

The present invention has been accomplished to overcome the aforementioned problems experienced with the conventional art and provides a planar light source which has a light guide plate and an illuminating light source, such as LEDs, arranged opposite a side surface of the light guide plate and which can prevent a formation of a dark-bright fringe pattern caused by bright lines.

As a first means to achieve the above objective, the present invention provides a planar light source comprising: a light guide plate made of a platelike, light-transmitting material formed with a light emitting surface on a top side thereof and a reflection surface on a bottom side thereof; and an illuminating light source arranged opposite a light receiving side surface of the light guide plate; wherein light coming from the illuminating light source into the light receiving side surface of the light guide plate is light-path-transformed by actions of the reflection surface and the light emitting surface of the light guide plate to emit a planar light flux from the light emitting surface; wherein chamfered portions are provided at an upper end of the light receiving side surface where the light receiving side surface and the light emitting surface of the light guide plate intersect and at a lower end of the light receiving side surface where the light receiving side surface and the reflection surface of the light guide plate intersect.

As a second means to achieve the above objective, the present invention provides a planar light source wherein curved portions are provided at an upper end of the light receiving side surface where the light receiving side surface and the light emitting surface of the light guide plate intersect and at a lower end of the light receiving side surface where the light receiving side surface and the reflection surface of the light guide plate intersect.

As a third means to achieve the above objective, the present invention provides a planar light source wherein a chamfered portion is provided either at an upper end of the light receiving side surface where the light receiving side surface and the light emitting surface of the light guide plate intersect or at a lower end of the light receiving side surface where the light receiving side surface and the reflection surface of the light guide plate intersect, and a curved portion is provided at the other end.

In one embodiment, a member for restricting a light transmission direction is arranged opposite the light emitting surface of the light guide plate and the light transmission direction restricting member is a prism sheet.

In one embodiment, the reflection surface of the light guide plate is formed at least partly of a plurality of prisms.

In another embodiment, the reflection surface of the light guide plate has a surface-textured reflection surface and a reflection surface formed of a plurality of prisms.

DESCRIPTION OF PREFERRED EMBODIMENTS

Figure 1:
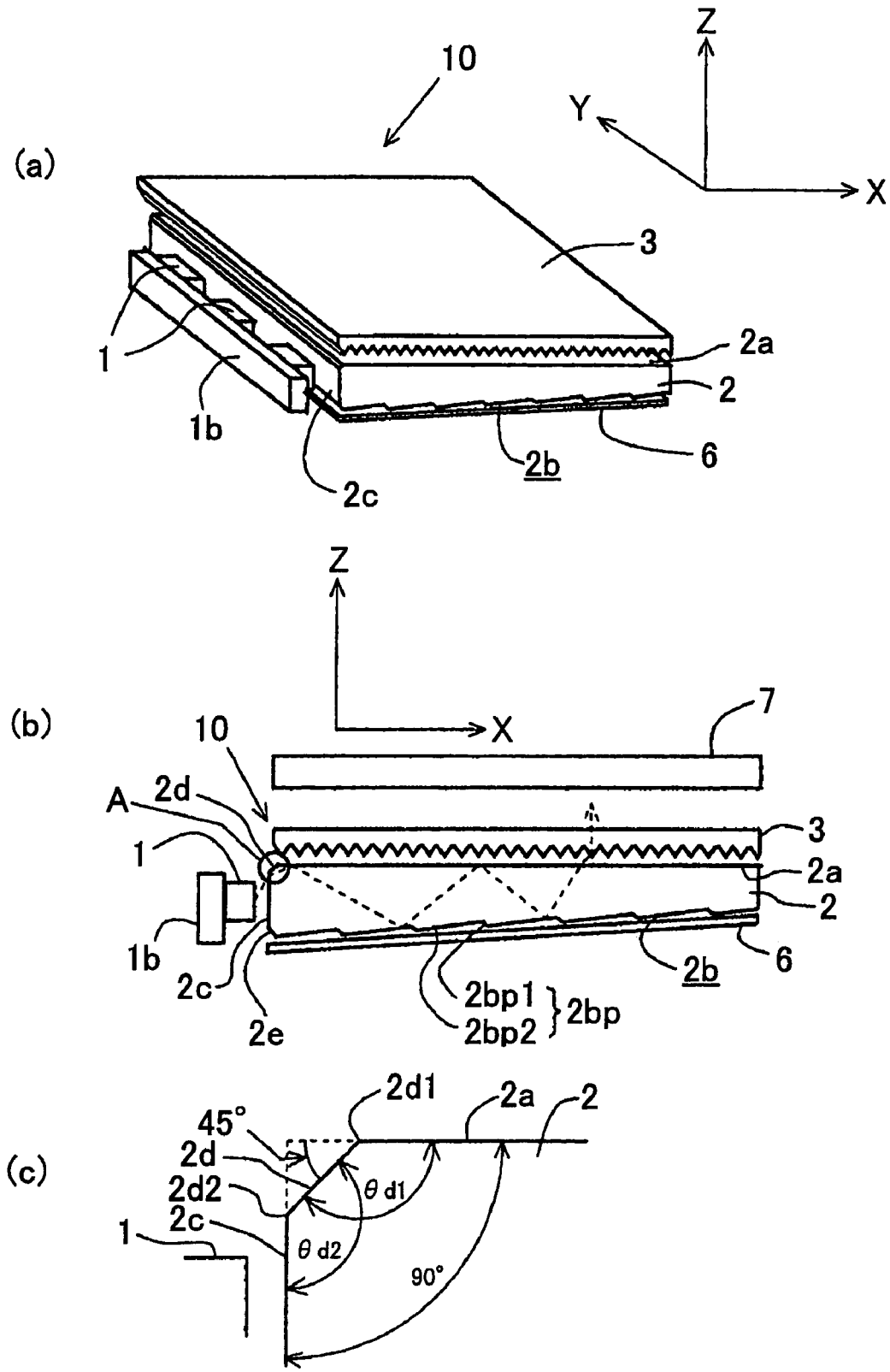
FIG. 1 is an explanatory diagram showing a planar light source according to a first embodiment of the present invention.

FIG. 1 illustrates a first embodiment of the planar light source according to the present invention, FIG. 1(*a*) representing a perspective view of the planar light source 10, FIG. 1(b) representing a side view of the same, FIG. 1(c) representing an enlarged view of portion A in FIG. 1(b).

In FIG. 1, reference number 1 represents LEDs as a light source, 1b a substrate on which to mount LEDs, 2 a light guide plate, 3 a prism sheet, 6 a reflector plate and 7 a liquid crystal panel. The light guide plate 2 is rectangular in plan view and formed of a light-transmitting resin, such as polycarbonate. 2a denotes a top surface of the light guide plate 2, and 2b a bottom surface. Designated 2c is a light receiving side surface 2c facing the LEDs 1. The bottom surface 2b is formed with a plurality of asymmetric prisms 2bp. The asymmetric prisms 2bp each have a down slope 2bp1 and an up slope 2bp2. The down slope 2bp1 is so configured that its distance to the top surface 2a sharply increases as a point of interest on the slope moves away from the light receiving side surface 2c. The up slope 2bp2 is so configured that its distance to the top surface 2a moderately decreases.

Denoted 2d is a chamfered portion formed at an intersection between the light receiving side surface 2c and the top surface 2a of the light guide plate 2. Designated 2e is another chamfered portion formed at an intersection between the light receiving side surface 2c and the bottom surface 2b of the light guide plate 2. An inclination angle of the chamfered portion 2d is, for example, roughly 45° as shown in FIG. 1(c).

Figure 7:
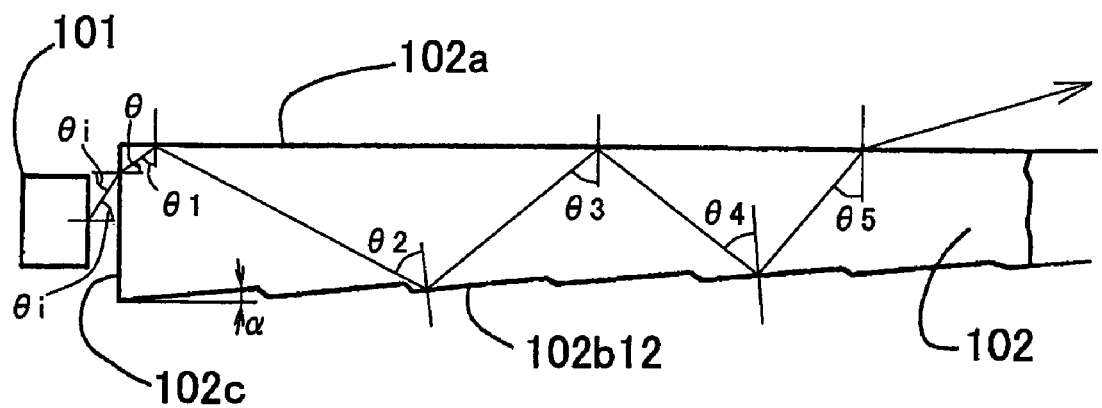
FIG. 7 is an explanatory diagram showing a normal reflection path in the conventional light guide plate of FIG. 6.
Figure 8:
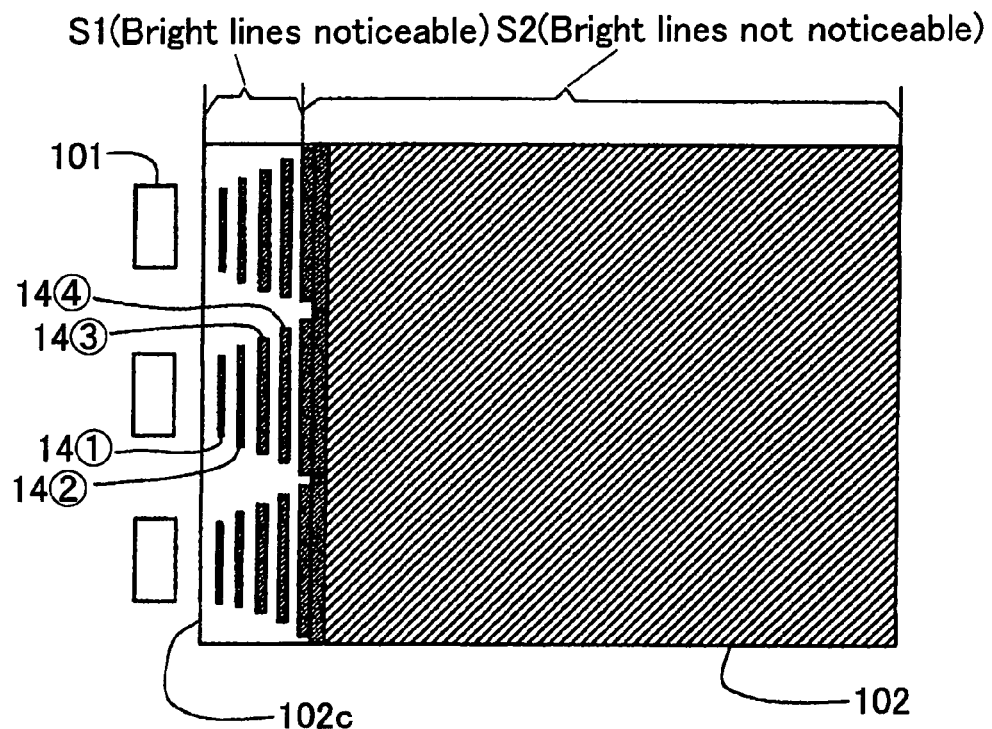
FIG. 8 is a plan view showing a state of illuminating light in the conventional light guide plate of FIG. 6.
Figure 9:
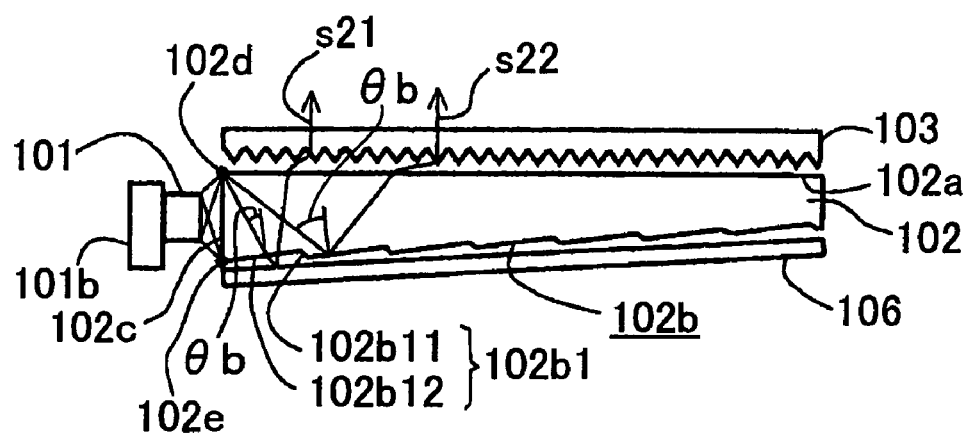
FIG. 9 is an explanatory diagram showing an abnormal reflection path in the conventional light guide plate of FIG. 6.
Figure 10:
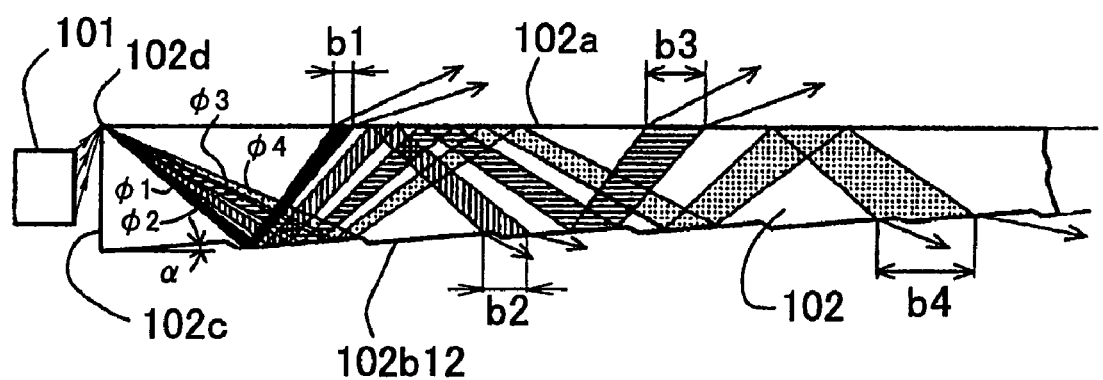
FIG. 10 is an explanatory diagram showing the abnormal path of light in the light guide plate of FIG. 6.
Figure 11:
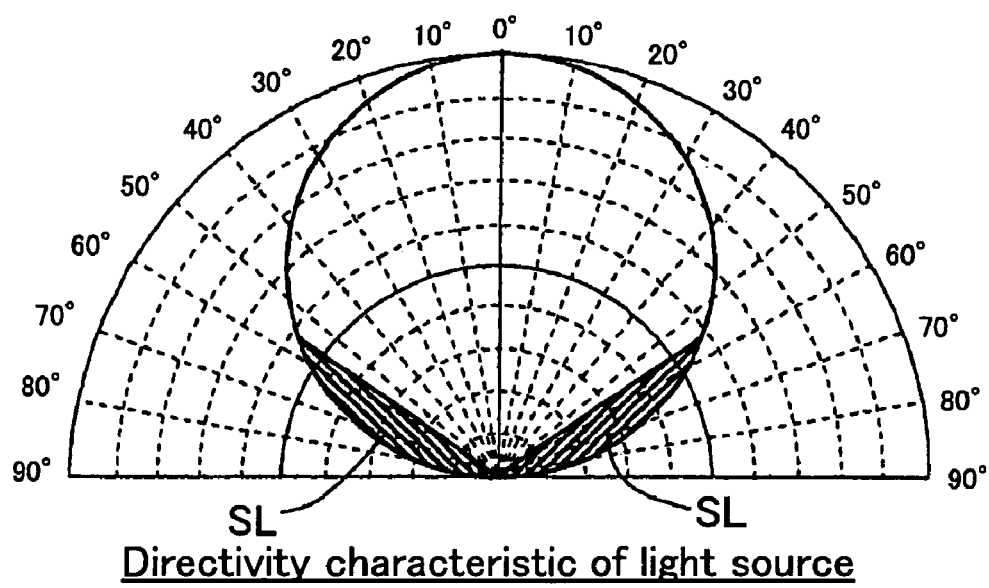
FIG. 11 is an explanatory diagram showing a directivity characteristic of an LED light source.

In this construction, when a predetermined amount of electricity is supplied from a power supply not shown to the LEDs 1, the LEDs 1 illuminate in white or a predetermined color. Of the emitted rays of light from the LEDs 1, one that has entered the light guide plate 2 through the light receiving side surface 2c (excluding the chamfered portions 2d, 2e), as shown by a dotted line in FIG. 1(b), has a smaller refracted angle than the critical angle of the light guide plate 2, so that, according to the same principle as explained in the conventional case of FIG. 7, when the ray first reaches the top surface 2a or bottom surface 2b, its incident angle on the surface ($\theta_1$ in FIG. 7) is greater than the critical angle and thus totally reflected. Then, the ray is repetitively reflected between the top surface 2a and the bottom surface 2b, as shown by the dotted line in FIG. 1(b), with its incident angle decreasing by an inclination angle of the slope (equivalent to $\alpha$ in FIG. 7) upon each reflection. When the incident angle is less than the critical angle, the ray is refracted and emitted outside. The light ray that has followed a normal path and exited from the top surface 2a of the light guide plate 2 enters the prism sheet 3. The ray that has entered the prism sheet 3 is specular-reflected in the prism sheet 3 until it changes its propagation direction to a Z direction. The light traveling in the Z direction is now incident on the liquid crystal panel 7. Therefore, the light passes through the liquid crystal in an ideal direction, making a clear and vivid image display possible.

As shown in an enlarged view of FIG. 1(c), an edge 2d1, at which the chamfered portion 2d and the top surface 2a cross each other, and an edge 2d2, at which the chamfered portion 2d and the light receiving side surface 2c intersect, have intersection angles $\theta d1$ and $\theta d2$ of more than 90°, which ensures a good transferability during the process of molding the light guide plate 2. So, the surfaces of the edges 2d1, 2d2 hardly become rough as in the conventional light guide plate 2. Therefore, at the edges 2d1, 2d2 a secondary light source as observed in the conventional light guide plate is hardly produced. Also, at the lower chamfered portion 2e in FIG. 1(b), a secondary light source is not easily formed, for the similar reason described above.

Therefore, in the planar light source 10 of the first embodiment, the conspicuous bright lines as observed in the conventional light guide plate can often be avoided.

Figure 2:
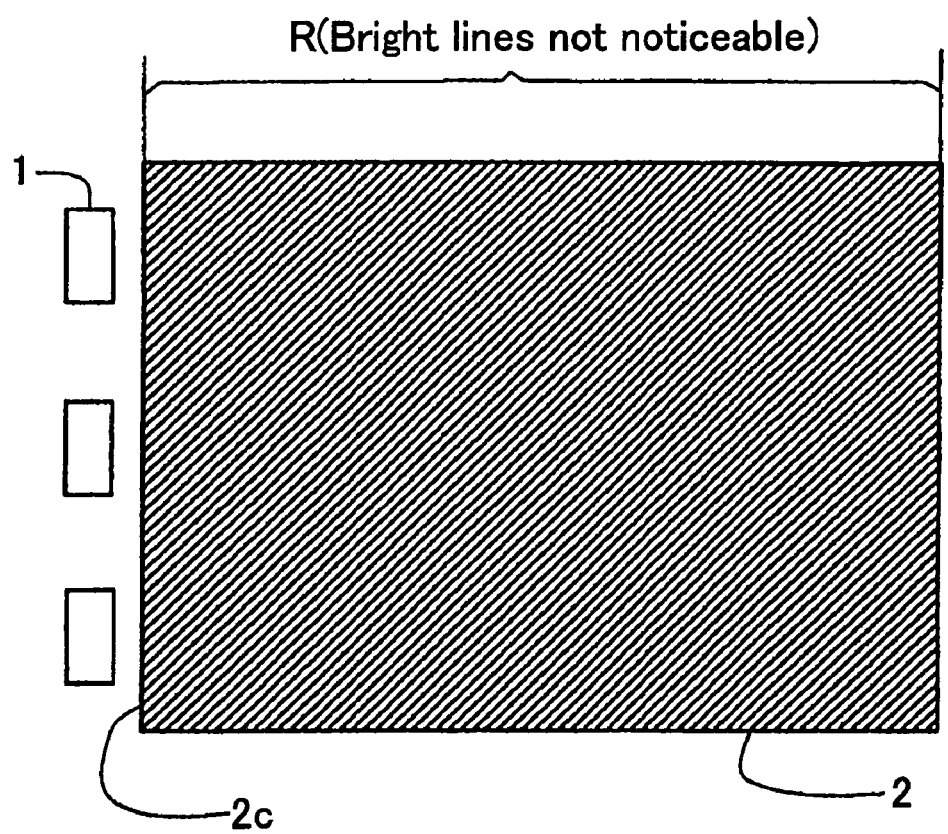
FIG. 2 is a plan view of the planar light source of FIG. 1.

FIG. 2 is a plan view showing one example of illuminating light produced in the planar light source 10. In this example, the light guide plate 2 has no conspicuous bright lines over an entire region R, unlike the conventional planar light source in which marked bright lines show up. Further, when a member for restricting the direction of light transmission, such as prism sheet or diffusion plate, is arranged opposite the top surface of the light guide plate 2, the distinguished bright lines show up in the conventional planar light source. In this invention, however, these bright lines can be eliminated easily.

Figure 3:
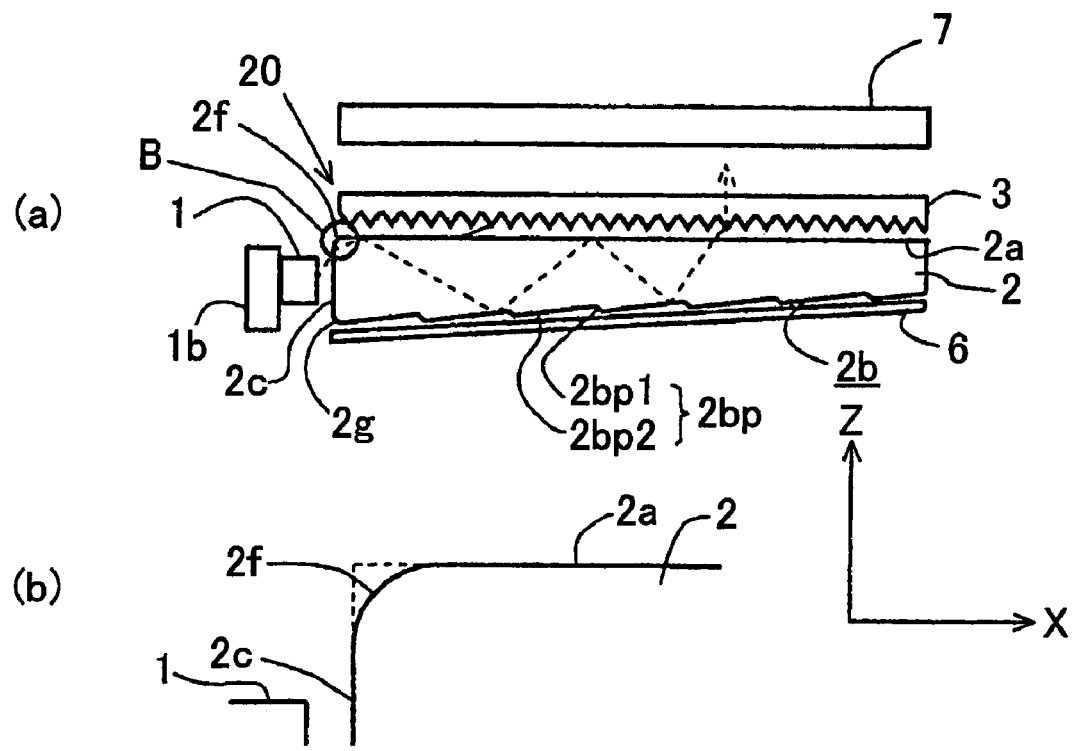
FIG. 3 is an explanatory diagram showing a planar light source according to a second embodiment of the present invention.

Next, a second embodiment of the planar light source according to this invention will be described. FIG. 3 illustrates the planar light source of the second embodiment, FIG. 3(a) representing a side view of the planar light source 20, FIG. 3(b) representing an enlarged view of a portion B in FIG. 3(a). In FIG. 3, reference number 2f denotes a curved portion, arc-shaped in cross section and formed at an intersection between the light receiving side surface 2c and the top surface 2a of the light guide plate 2. Reference number 2g designates a curved portion, arc-shaped in cross section and formed at an intersection between the light receiving side surface 2c and the bottom surface 2b of the light guide plate 2. In other respects, the construction is almost the same as that of the planar light source 10 of FIG. 1 and thus its detailed explanation is omitted. Since the two curved portions 2f and 2g have their surfaces curved moderately, the transferability during the molding of the light guide plate 2 is improved. This contributes to preventing their surfaces from being formed rough as they are in the conventional edge portions, which in turn makes it easy to prevent the formation of a secondary light source. As a result, no conspicuous bright lines observed in the conventional light guide plate show up. In FIG. 3(a), a dotted line represents a normal path of a ray emitted from the LEDs 1 and entering the light guide plate 2.

Figure 4:
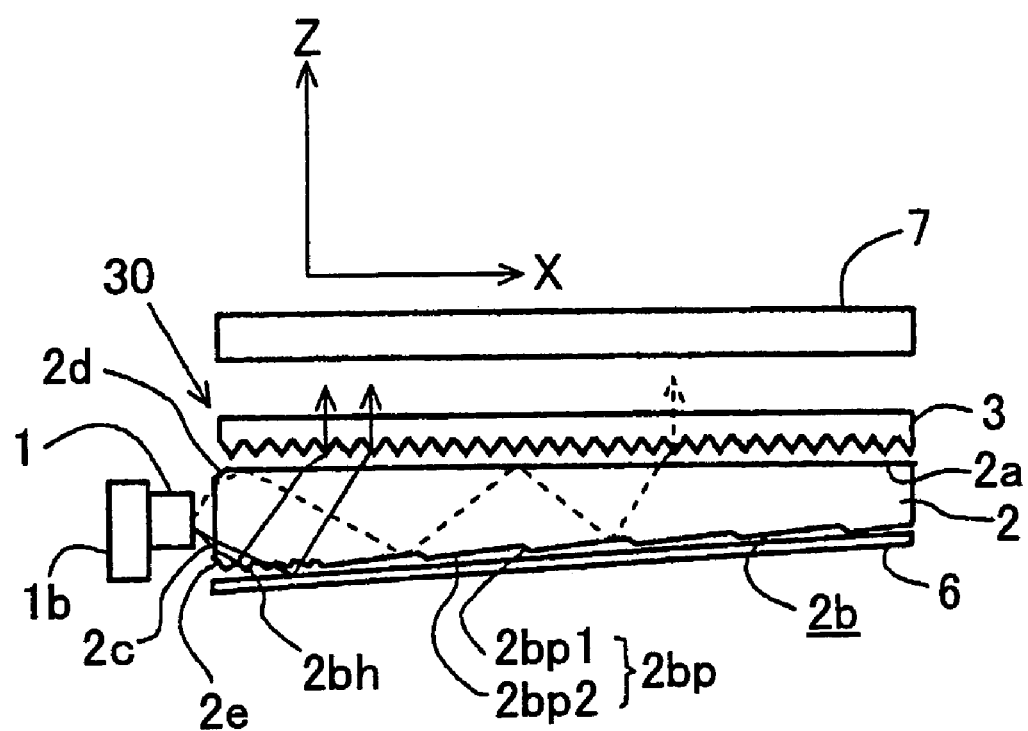
FIG. 4 is an explanatory diagram showing a planar light source according to a third embodiment of the present invention.

Next, a third embodiment of the planar light source according to this invention will be described. FIG. 4 is a side view of the planar light source 30 of the third embodiment. The planar light source 30 of the third embodiment is a variation of the first embodiment of FIG. 1. In FIG. 4, reference number 2bh represents a textured reflection surface formed on the bottom surface 2b of the light guide plate 2 near the lower chamfered portion 2e. In other respects, the construction is almost the same as that of the planar light source 10 of FIG. 1 and thus its detailed explanation is omitted. The textured reflection surface 2bh has an irregular pattern of fine, recessed and raised portions. Therefore, some of the rays scattered by the textured reflection surface 2bh travel directly toward the top surface 2a and some exit downward. Those scattered rays that have exited from the bottom surface 2b of the light guide plate 2 are reflected by the reflector plate 6 to reenter the light guide plate 2 and travel toward the top surface 2a. In addition to the light paths using the asymmetric prisms 2bp, there are other light paths using the textured reflection surface 2bh. As a result, light can be emitted upward also from that region of the top surface 2a of the light guide plate 2 which is close to the light receiving side surface 2c, thus allowing the illumination area to be extended close to the light receiving side surface 2c. In the third embodiment, too, the use of the upper and lower chamfered portions 2d, 2e can easily prevent the formation of such secondary light sources as are formed at the conventional edge portions of the light guide plate 2, thus rendering the bright lines inconspicuous when the planar light source 30 is illuminated.

Figure 5:
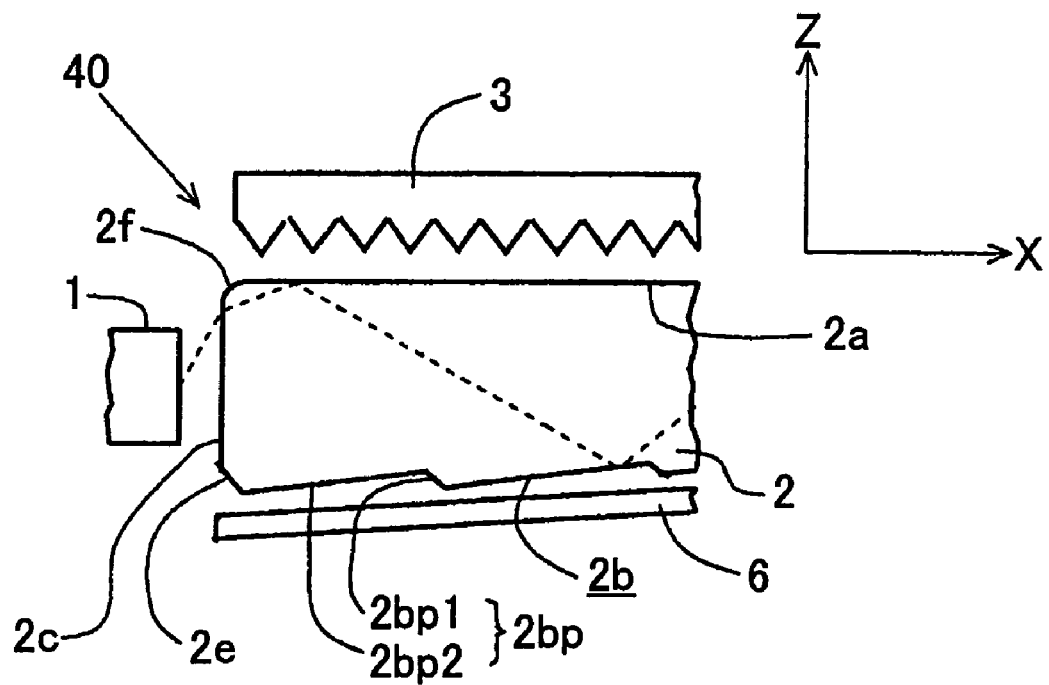
FIG. 5 is an explanatory diagram showing a planar light source according to a fourth embodiment of the present invention.
Figure 6:
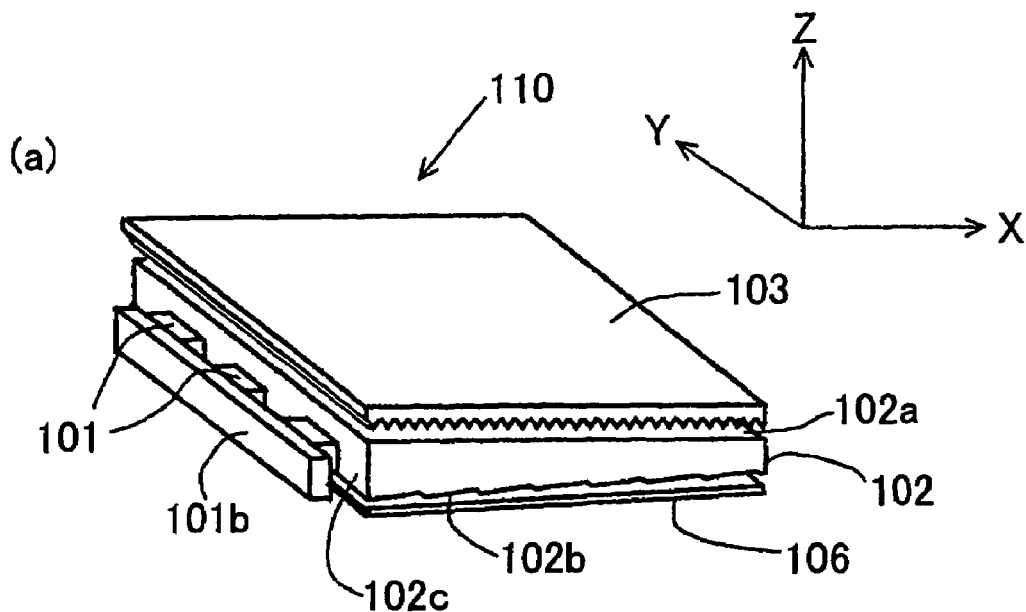
FIG. 6 is an explanatory diagram showing a backlight unit using a conventional light guide plate.
Figure 6:
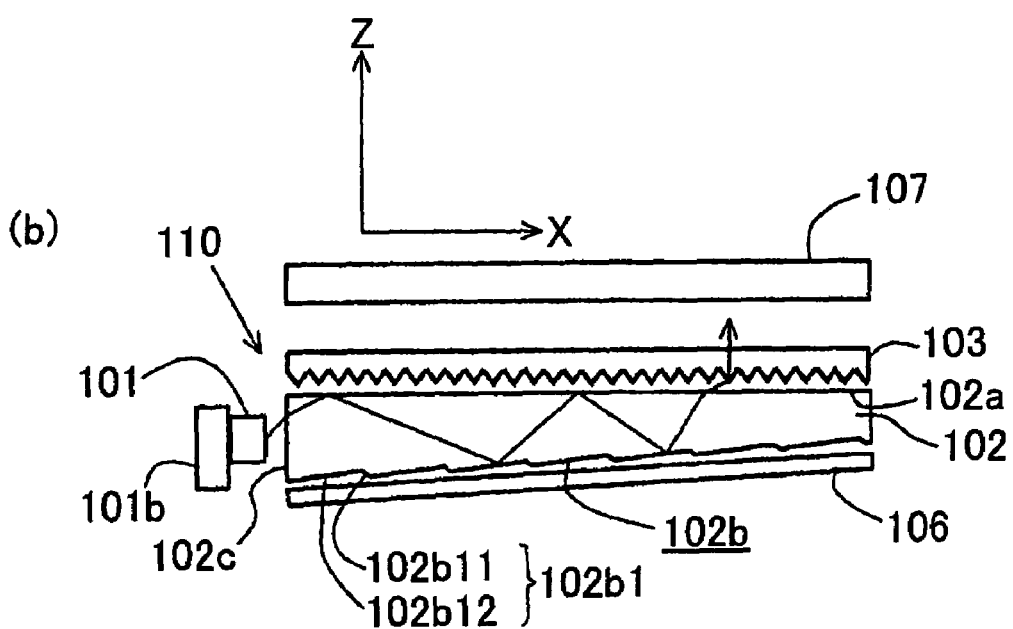

Next, a fourth embodiment of the planar light source according to this invention will be described. FIG. 5 is a side view showing the planar light source 40 of the fourth embodiment. As shown in FIG. 5, the light guide plate is formed with a curved portion 2f, arc-shaped in cross section, at an intersection between the top surface 2a and the light receiving side surface 2c of the light guide plate 2. At an intersection between the bottom surface 2b and the light receiving side surface 2c, the light guide plate has a chamfered portion 2e. In this planar light source 40, the presence of the curved portion 2f and the chamfered portion 2e makes the generation of the secondary light source unlikely because of the principle already explained. Thus, when the planar light source is illuminated, the bright lines do not show up.

In all the embodiments described above, the whole or most of the bottom surface of the light guide plate of the planar light source is formed of asymmetric prisms. The present invention is not limited to this construction. For example, all or most of the bottom reflection surface of the light guide plate may be formed of symmetric prisms or formed with a regular or irregular pattern of recessed and raised portions formed by printing, surface texturing or dot formation. In this case also, the provision of the chamfered portion 2e and the curved portion 2f at the upper and lower edges of the light receiving side surface 2c of the light guide plate 2 can prevent the formation of the secondary light source, eliminating or making less conspicuous the bright lines which would otherwise be formed by the illuminating light.

As described above, the planar light source according to the present invention can make indistinguishable the bright lines, that may be produced during illumination, to prevent a dark-bright fringe pattern from showing up, thereby preventing a possible degradation of liquid crystal display quality.

What is claimed is:

1. A planar light source comprising:
 a light guide plate made of a plate-like, light-transmitting material formed with a light emitting surface on a top side thereof and a reflection surface on a bottom side thereof; and
 an illuminating light source arranged opposite a light receiving side surface of the light guide plate;
 wherein light coming from the illuminating light source into the light receiving side surface of the light guide plate is light-path-transformed by actions of the reflection surface and the light emitting surface of the light guide plate to emit a planar light flux from the light emitting surface;
 wherein chamfered portions are provided at an upper end of the light receiving side surface where the light receiving side surface and the light emitting surface of the light guide plate intersect and at a lower end of the light receiving side surface where the light receiving side surface and the reflection surface of the light guide plate intersect, and
 wherein the reflection surface of the light guide plate includes a textured reflection surface and asymmetric prisms, which are formed on the reflection surface.

2. A planar light source comprising:
 a light guide plate made of plate-like, light-transmitting material formed with a light emitting surface on a top side thereof and a reflection surface on a bottom side thereof; and
 an illuminating light source arranged opposite a light receiving side surface of the light guide plate;
 wherein light coming from the illuminating light source into the light receiving side surface of the light guide plate is light-path-transformed by actions of the reflection surface and the light emitting surface of the light guide plate to emit a planar light flux from the light emitting surface;
 wherein curved portions are provided at an upper end of the light receiving side surface where the light receiving side surface and the light emitting surface of the light guide plate intersect and at a lower end of the light receiving side surface where the light receiving side surface and the reflection surface of the light guide plate intersect, and
 wherein the reflection surface of the light guide plate includes a textured reflection surface and asymmetric prisms, which are formed on the reflection surface.

3. A planar light source comprising:
 a light guide plate made of a plate-like, light-transmitting material formed with a light emitting surface on a top side thereof and a reflection surface on a bottom side thereof; and
 an illuminating light source arranged opposite a light receiving side surface of the light guide plate;
 wherein light coming from the illuminating light source into the light receiving side surface of the light guide plate is light-path-transformed by actions of the reflection surface and the light emitting surface of the light guide plate to emit a planar light flux from the light emitting surface;
 wherein a chamfered portion is provided either at an upper end of the light receiving side surface where the light receiving side surface and the light emitting surface of the light guide plate intersect or at a lower end of the light receiving side surface where the light receiving side surface and the reflection surface of the light guide plate intersect, and a curved portion is provided at the other end, and
 wherein the reflection surface includes a textured reflection surface and asymmetric prisms, which are formed on the reflection surface.

4. A planar light source according to any one of claims 1 to 3, wherein a member for restricting a direction of light transmission is arranged opposite the light emitting surface of the light guide plate.

5. A planar light source according to claim 4, wherein the member for restricting the direction of light transmission is a prism sheet.

6. A planar light source according to any one of claims 1 to 3, wherein the textured reflection surface is formed at an area near the light receiving side surface of the light guide plate, and
 wherein the asymmetric prisms are formed at an area remote from the light receiving side surface of the light guide plate.

* * * * *